United States Patent [19]

Murray

[11] 4,336,920
[45] Jun. 29, 1982

[54] VALVE ELEMENT WITH MOLDED RESILIENT TIP AND METHOD OF MAKING SAME

[75] Inventor: Myles N. Murray, Chagrin Falls, Ohio

[73] Assignee: Industrial Electronic Rubber Company, Twinsburg, Ohio

[21] Appl. No.: 165,299

[22] Filed: Jul. 2, 1980

[51] Int. Cl.³ .................. F16K 51/00; B29D 3/00; B29F 1/00
[52] U.S. Cl. .................. 251/357; 29/157 R; 29/157.1 A; 29/527.4; 251/DIG. 4; 264/274; 264/275; 264/279; 264/328.1; 264/328.9
[58] Field of Search ............ 264/249, 274, 259, 328.1, 264/328.9, 275, 279; 251/356–358, DIG. 4; 29/157 R, 157.1 A, 527.4

[56] References Cited

U.S. PATENT DOCUMENTS

| | | | |
|---|---|---|---|
| 3,326,520 | 6/1967 | Guenther | 251/358 |
| 3,326,521 | 5/1967 | Murray | 251/358 |
| 3,381,352 | 5/1968 | Lindner et al. | 251/358 |
| 3,445,089 | 5/1969 | Murray | 251/358 |
| 3,861,646 | 1/1975 | Douglas | 251/356 |
| 4,196,886 | 4/1980 | Murray | 251/357 |

*Primary Examiner*—Willard E. Hoag
*Attorney, Agent, or Firm*—Maky, Renner, Otto & Boisselle

[57] ABSTRACT

The valve element and method of making same are characterized by a valve body having at the neck thereof a small radially outwardly projecting annular crimp bead and a resilient tip molded on the body at the neck. To mold the tip, the body is axially aligned and urged into the mouth of an open ended mold to close the cavity therein with the crimp bead engaging and being crimped by the mold wall to effect a tight annular seal about the body periphery thereby to preclude leakage of fluid material introduced in the closed cavity to form the tip, but without the development of substantial pressures in the mold that might cause excessive wear and damage to the mold.

9 Claims, 2 Drawing Figures

VALVE ELEMENT WITH MOLDED RESILIENT TIP AND METHOD OF MAKING SAME

This invention relates to valve elements of the type comprising a relatively rigid body and a tip of resilient material applied thereto as the active sealing portion of the valve element. This invention more particularly is concerned with an improved method in the manufacture of such valve elements and the valve elements manufactured in accordance with such improved method.

BACKGROUND OF THE INVENTION

The resilient tip needle valve elements now being used in fuel inlet valve assemblies of carburetors for internal combustion engines is a specific example of the above-indicated valve type and one with which the present invention is particularly concerned. Examples of such type of valve elements which have become widely used can be seen in U.S. Pat. Nos. 3,455,089 and 3,326,521.

The manufacture of such valve elements have entailed the use of extruded metal stock of a cross-sectional shape which is not coincident with the shape of the passage in which the valve body will be disposed in use, so that the body may be guided in the passage by only limited contact therewith and will permit the flow of fuel along the length of the body through the passage. For example, it has been a practice to employ such a metal body of generally triangular or square cross-sectional shape in cylindrical fuel inlets whereby longitudinal passages are defined between the body and the inlet at the flat sides of the former. It has also been a practice, for the same purpose, to use an elongated metal body which is fluted about its periphery or serrated to provide in each case the necessary combination of limited supporting and guiding contact, the movement being axial, and the non-obstructed peripheral spaces for the flow of the fuel.

As noted above, the body usually is made from extruded metal stock, since this type of production is the most convenient and inexpensive in permitting continuous manufacture of the stock to the controlled cross-sectional shape. The thusly formed metal stock for the valve body is cut at intervals determined by the desired length for a given valve element, and the individual valve bodies then each are provided with a cylindrical turned extension or neck at the tip end, with this operation being performed usually on a screw machine. The tip of rubber or other resilient material thereafter is applied against this turned neck usually by molding a generally conical tip with some anchoring interfit with the body being provided, for example, by a headed pin secured in a tapped socket in the body. The end result is a valve element having a firmly attached tip molded in place and projecting from the cylindrical neck or extension of the body.

To mold the resilient tip on the end of the body, the cylindrical neck of the body commonly is aligned with and positioned in the mouth of an open ended mold thereby to close the mold cavity therein whereafter fluid material is introduced into the thusly closed cavity. It is desirable, if not essential, that the body be urged into firm contact with the mold to form a tight annular seal about the body periphery at the cylindrical neck that will preclude leakage of fluid material until such time as the latter is solidified. To provide such a seal, typically there is provided a crimp or swage wall into which the turned cylindrical neck of the body is urged, the neck having an outer diameter slightly greater than the inner diameter of the crimp wall so that the neck is swaged to a limited extent by the crimp wall as it is inserted into the mold thereby to form a tight seal. However, because of the variation in diameter of the turned neck within economically justifiable tolerances, a tight seal heretofore has not been assured and further the mold may be damaged or caused to wear prematurely. If the bodies run small at the turned neck, for example, the part will not form a tight seal with the crimp wall and rubber may escape between the neck and the crimp wall and ruin the part. On the other hand, if the bodies run large at the turned neck, the mold may be subjected to excessive and substantial pressures at the crimp wall which may cause the mold to wear prematurely or even crack. Of course, this problem can be overcome by machining the necks within extremely close tolerance; however, this has not been an economically feasible solution.

OBJECTS OF THE INVENTION

It is accordingly a principal object of this invention to provide an improved method for manufacturing valve elements of the above type which is not subject to the aforenoted drawbacks in conventional manufacturing techniques.

It is another principal object of the present invention to provide an improved method for manufacturing such valve elements that is economical, reduces the incidence of ruined parts, and increases the life of molds employed in accordance therewith to form the resilient tips on the bodies of such parts.

It is still another object of the invention to provide resilient tip needle valve elements that are of less expensive manufacture.

Other objects and advantages of the present invention will become apparent as the following description proceeds.

SUMMARY OF THE INVENTION

To the achievement of the foregoing and other objects of the invention, there is provided an improved method of manufacturing a resilient tip valve element, which method comprises the steps of: (a) providing an open mouth mold having therein an open ended mold cavity and an annular crimp wall defining the open end of the cavity; (b) providing a valve body including at one end thereof a cylindrical neck having an end face and an outer diameter not greater and preferably less than the inner diameter of the crimp wall, and a small annular crimp bead projecting radially outwardly from the neck at the end face thereof and having an outer diameter slightly greater than that of the crimp wall; (c) closing the open end of the mold cavity by axially aligning and urging the body into the mouth of the mold with the crimp bead engaging the crimp wall and being crimped thereby to effect a tight annular seal around the neck thereby to form a closed cavity defined by the cavity wall of the mold and the end face of the body; and (d) then filling the thusly closed cavity with fluid material and curing same to form the resilient tip.

By employing the small crimp bead at the end of the neck of the body, there is assured sufficient interference between the body and mold thus preventing leakage, but without subjecting the mold cavity at the crimp wall to excessive pressure. The new manufacturing method thereby reduces or eliminates the incidence of ruined parts and increases mold life, all to the production of an inexpensive resilient tip valve element wherein the small crimp bead is completely tolerated in usage.

To the accomplishment of the foregoing and related ends, the invention then comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

DETAILED DESCRIPTION

Figure 1:
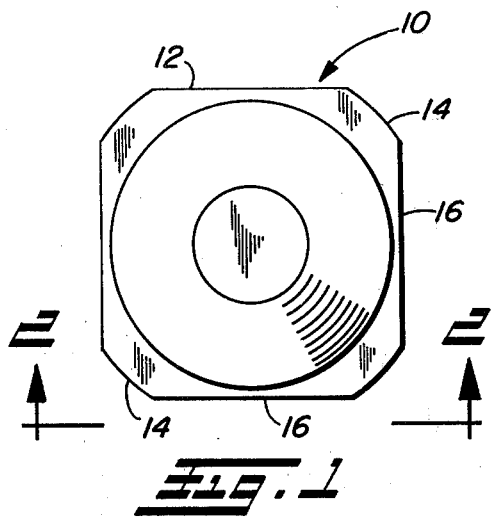
FIG. 1 is an end view of a resilient tip valve element according to the invention.
Figure 2:
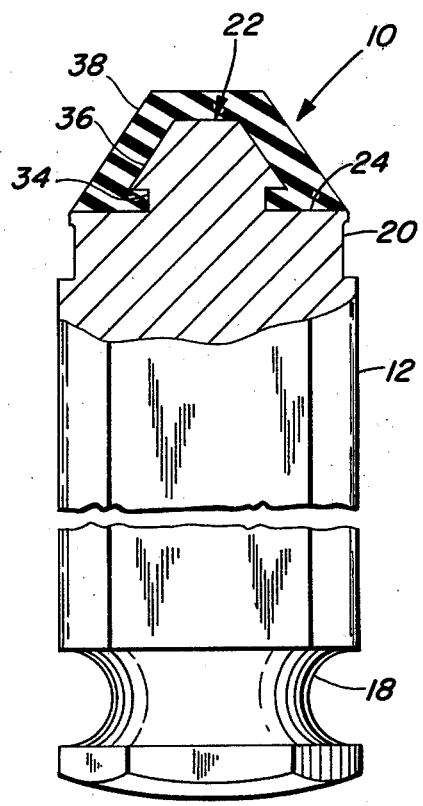
FIG. 2 is a fragmented side elevation, partly in section, of the valve element of FIG. 1, taken substantially along the line 2—2 thereof.

Referring now to the drawing in detail, a valve element according to the invention is designated generally by reference numeral 10 in FIGS. 1 and 2. The valve element 10 is in the form of a carburetor float valve having a rigid elongated body 12 which is preferably made of a metal as previously used in carburetors for internal combustion engines and the like. The metal body will ordinarily be made of stainless steel or brass, these being the typical metals employed in view of the exposure to gasoline in the indicated use, although it should clearly be understood that any rigid composition compatible for the intended operative environment can be used.

The elongated body 12 provided may be of any non-circular cross-section and as shown is generally square but with the corners 14 rounded. The rounded corners 14 will engage the wall of the cylindrical fuel inlet passage of a carburetor, with the flat sides 16 and the passage wall defining segmental passages for the fuel flow.

The body 12 will ordinarily be produced by stock extrusion as a continuous blank of the desired cross-sectional size and shape and then severed into appropriate lengths to form the valve bodies which subsequently are each turned at one end in a conventional screw machine operation to form an undercut 18 for enabling attachment of the body to the float arm of the carburetor. At its other end, the body is turned to provide a cylindrical extension or neck portion 20 and a spear-like portion 22 projecting axially from the end face 24 of the neck 20.

As seen in FIG. 2, the spear-like portion 22 has a reduced cylindrical portion 34 connecting to the neck 20 a relatively enlarged head portion 36 which has the form of a truncated cone and serves to lock a resilient tip 38 of conical shape to the body 12. It will also be seen that the head 36 of the spear-like portion 22 is of the same form as the finished molded tip 38 of a smaller size, with the tip enclosing the head. The head of the spear-like portion thus serves as a rigid preform for the tip and not only provides an added degree of rigidity but takes the place of a substantial mass of the rubber which would be present in a solid rubber tip.

The tip 38 of the valve element 10 is preferably formed of a synthetic rubber material composition which will remain substantially unaffected by contact with liquid fuel or other fluid with which it is used. One such type of composition is disclosed in applicant's U.S. Pat. No. 4,196,886 which material provides for improved performance in such type of valves. The use of such a rubber-like material assures a more efficient operation and longer useful life to the carburetor valve.

Figure 3:
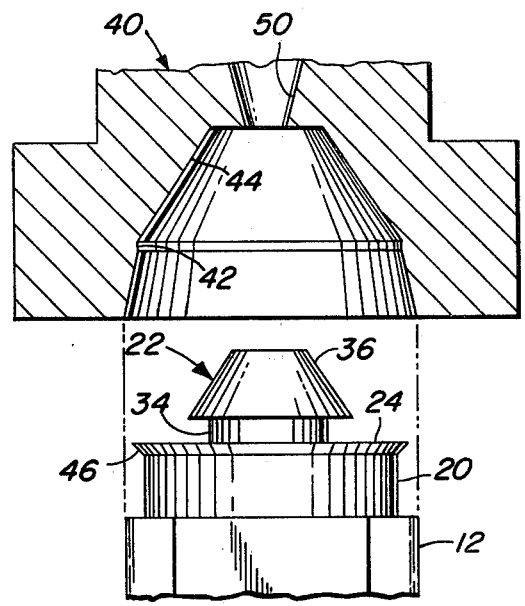
FIG. 3 is a fragmented section of a mold utilized to form the resilient tip on the end of the valve body, the valve body being shown just prior to insertion in the mold.

To form the tip 38 directly on the body 12, the body is aligned with and inserted into the open mouth of a mold 40 such as is illustrated in FIG. 3. Such mold 40 includes an annular cylindrical crimp or swage wall 42 defining the open end of the mold cavity 44. The cavity 44 is closed by the end face of the cylindrical neck 20 of the body when the neck is urged into firm contact with the crimp wall.

As previously indicated, the turned cylindrical neck of the valve body when machined within economically feasible tolerances may run small and thus not properly engage the crimp wall to seal sufficiently against leakage when liquid molding composition is introduced under pressure into the mold cavity. On the other hand, the neck may run large and result in the development of too great a pressure at the mold and body interface thereby causing excessive mold wear and even cracking of the mold.

To overcome this problem and according to the present invention, there is provided a small annular radially outwardly projecting crimp bead 46 on the cylindrical neck 20 of the body 12. As best seen in FIG. 3, the bead 46 shown is flush with the end face 26 of the body and is radially tapered thereby giving the bead a generally triangular cross-sectional shape. However, it should be understood that other bead shapes may be employed to achieve the advantages of this invention.

With the foregoing construction, the body 12 to form the neck 20 may be machined on a conventional screw machine within conventional tolerances such as plus or minus 0.002 inch, with the maximum acceptable diameter being not greater than and preferably slightly less than the diameter of the crimp wall 42 of the mold 40. The bead, which may be readily formed on the cylindrical neck during the same turning operation, projects radially outwardly beyond the cylindrical neck a distance at least equal and preferably slightly more than such given tolerance. Thus, for a neck tolerance of plus or minus 0.002 inch, for example, the bead projects at least 0.004 inch. It will be therefore be appreciated that even when the neck is at the smaller end of the given tolerance, the crimp bead 46 will engage the crimp wall 42 and be crimped thereby to effect a tight annular seal about the periphery of the neck. When the neck is at the larger end of the given tolerance range, essentially only the small bead will be crimped or displaced without the development of large pressures at the crimp wall that otherwise would occur if the entire cylindrical neck were being swaged. Accordingly, the crimp bead assures an effective seal without subjecting the mold to premature wear or damage.

Figure 4:
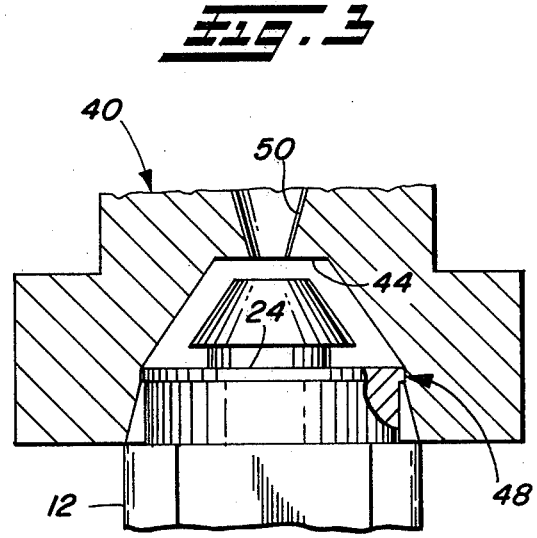
FIG. 4 is a section similar to that of FIG. 3 but with the valve body inserted in the mold in accordance with the invention.

Having now inserted the body 12 in the mold 40 with the crimp head 46 crimped at the crimp wall 42 of the mold cavity 44 as seen at 48 in FIG. 4, liquid molding composition may be introduced through sprue passage 50 into the thusly closed and sealed mold cavity such as by conventional molding techniques and particular transfer and compression molding techniques. After the molding composition has solidified, the body with the tip molded thereon is withdrawn from the mold and if not yet fully cured, may be permitted to cure thoroughly outside the mold so that the mold is available to repeat the operation with the next valve body.

As is clear from the foregoing description of the valve element structure and method, the present invention embodies advantages heretofore lacking in the prior art. Notably, the annular crimp bead 46 provided on the neck 20 of the body 12 assures an effective seal between the body and the mold during the molding operation without the development of substantial pressures in the mold part that may result in damage or premature wear to the mold part. Accordingly, the new manufacturing method reduces or eliminates the incidence of ruined parts and increases mold life, all to the production of an inexpensive resilient tip valve element wherein the small crimp bead is completely tolerated in usage.

Although the invention has been shown and described with respect to a preferred embodiment, it is obvious that equivalent alterations and modifications will occur to others skilled in the art upon the reading and understanding of the specification. It will be obvious, for example, that the same considerations apply as well to the use of a body of triangular section and other shapes which are not coincident with the passage in which the particular element is to be disposed in use. It also will be obvious that the spear-like portion of the body need not be employed, it being acceptable only to provide some means to lock securely the resilient tip to the body upon completion of the molding operation; or could be formed as a separate piece and attached to the body, as is known to those skilled in the art. The present invention includes all such equivalent alterations and modifications, and is limited only by the scope of the following claims.

The embodiments of the invention in which an exclusive property or privilege is claimed are defined as follows:

1. A method of forming a resilient tip valve element, comprising the steps of:
    (a) providing an open mouth mold having therein an annular crimp wall defining the open end of a mold cavity;
    (b) providing a valve body having at one end thereof a cylindrical neck having an end face and an outer diameter not greater than the inner diameter of the crimp wall and a small annular crimp bead projecting radially outwardly from the neck at the end face and having an outer diameter greater than that of the crimp wall;
    (c) closing the open end of the mold cavity by axially aligning and urging the body into the mold with the crimp bead engaging the crimp wall and crimping the bead thereby to effect a tight annular seal around the neck at the end face thereby to form a closed cavity defined by the cavity wall and end face; and
    (d) filling the thusly closed cavity with fluid material and curing same to form the resilient tip.

2. The method of claim 1 wherein step (b) includes using a valve body wherein the neck has been formed within a given tolerance and the bead projects radially beyond the neck a distance at least equal the given tolerance.

3. The method of claim 1 wherein step (b) includes using a valve body wherein the bead is flush with the end face of the cylindrical neck and is radially tapered.

4. The method of claim 1 wherein step (a) includes using a mold part having a cylindrical crimp wall.

5. A method of forming a resilient tip valve element or the like, comprising the steps of:
    (a) providing an open mouth mold having therein an open ended mold cavity;
    (b) providing a valve body having at one end thereof an end face of a cross-sectional shape corresponding to that of the open end of the mold cavity but of a lesser dimension and a small annular crimp bead projecting radially outwardly from the valve body at the end face and having a radial dimension greater than that of the open end of the mold cavity;
    (c) closing the open end of the mold cavity by axially aligning and urging the body into the mold with the crimp bead engaging the wall of the mold cavity at the open end thereof and crimping the bead thereby to effect a tight annular seal around the body at the end face thereof thereby to form a closed cavity; and
    (d) filling the thusly closed cavity with fluid material and curing same to form the resilient tip.

6. A valve element manufactured in accordance with one of the methods of claims 1, 2, 3 and 5.

7. The method of claim 5 wherein step (b) includes using a valve body wherein the neck has been formed within a given tolerance and the bead projects radially beyond the neck a distance at least equal the given tolerance.

8. The method of claim 5 wherein step (b) includes using a valve body wherein the bead is flush with the end face of the cylindrical neck and is radially tapered.

9. A method of forming a resilient sealing portion on a rigid valve body comprising the steps of:
    (a) providing a mold having therein an open ended mold cavity;
    (b) providing a rigid valve body having at one end thereof an end face of a cross sectional shape corresponding to that of the open end of the mold cavity but of a lesser dimension and a small, easily deformable annular crimp bead projecting radially outwardly from the valve body at the end face and having a radial dimension greater than that of the open end of the mold cavity;
    (c) axially aligning and urging the body into the open end of the mold cavity with the crimp bead engaging the wall of the mold cavity at the open end thereof such that the bead is crimped to effect a tight annular seal around the body at the end face thereof; and
    (d) filling the mold with fluid material and curing same to form a resilient sealing portion at the end face of the valve body.

* * * * *